United States Patent
Li et al.

(10) Patent No.: US 11,347,090 B2
(45) Date of Patent: May 31, 2022

(54) LIQUID CRYSTAL DISPLAY PANEL, DRIVING METHOD THEREOF, AND DISPLAY DEVICE

(71) Applicant: BOE TECHNOLOGY GROUP CO., LTD., Beijing (CN)

(72) Inventors: Zhongxiao Li, Beijing (CN); Qian Wang, Beijing (CN); Wenqing Zhao, Beijing (CN); Song Yang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/286,640

(22) PCT Filed: Aug. 25, 2020

(86) PCT No.: PCT/CN2020/110996
§ 371 (c)(1),
(2) Date: Apr. 19, 2021

(87) PCT Pub. No.: WO2021/068661
PCT Pub. Date: Apr. 15, 2021

(65) Prior Publication Data
US 2021/0373371 A1    Dec. 2, 2021

(30) Foreign Application Priority Data
Oct. 8, 2019    (CN) .......................... 201910949636.3

(51) Int. Cl.
*G02F 1/133*    (2006.01)
*G02F 1/1335*   (2006.01)
(Continued)

(52) U.S. Cl.
CPC ......... *G02F 1/13306* (2013.01); *G02B 6/005* (2013.01); *G02F 1/133345* (2013.01);
(Continued)

(58) Field of Classification Search
None
See application file for complete search history.

(56) References Cited

U.S. PATENT DOCUMENTS

2008/0084517 A1*    4/2008   Itou .................. G02F 1/133555
                                                           349/62
2012/0105767 A1*    5/2012   Choi .................... G02B 6/0038
                                                           362/621
(Continued)

FOREIGN PATENT DOCUMENTS

CN          107817629 A      3/2018
CN          107942575 A      4/2018
(Continued)

OTHER PUBLICATIONS

Chinese Office Action corresponding to CN 201910949636.3, dated Feb. 3, 2021 (9 pages, including English translation).
(Continued)

*Primary Examiner* — Ryan Crockett
(74) *Attorney, Agent, or Firm* — Myers Bigel P.A.

(57) ABSTRACT

A liquid crystal display panel includes a first substrate, a second substrate, a liquid crystal layer between the first substrate and the second substrate, a first light source and a second light source. The liquid crystal display panel is configured to provide a brightness selected from a first set or a second set, and the first light and the second light are configured to not emit light simultaneously. A driving method of the liquid crystal display panel and a display device including the liquid crystal display panel are further provided.

20 Claims, 5 Drawing Sheets

(51) Int. Cl.
*F21V 8/00* (2006.01)
*G02F 1/1333* (2006.01)
*G02F 1/1343* (2006.01)

(52) U.S. Cl.
CPC .. *G02F 1/133514* (2013.01); *G02F 1/133531* (2021.01); *G02F 1/133548* (2021.01); *G02F 1/133553* (2013.01); *G02F 1/133565* (2021.01); *G02F 1/133616* (2021.01); *G02F 1/134309* (2013.01); *G02F 2202/36* (2013.01)

(56) References Cited

U.S. PATENT DOCUMENTS

| | | |
|---|---|---|
| 2016/0247466 A1 | 8/2016 | Kimura |
| 2018/0203271 A1* | 7/2018 | Wang ................. H01L 27/3232 |
| 2019/0204708 A1 | 7/2019 | Wang |
| 2019/0285935 A1* | 9/2019 | Tan .................... G02F 1/133526 |
| 2020/0379157 A1 | 12/2020 | Meng et al. |

FOREIGN PATENT DOCUMENTS

| | | |
|---|---|---|
| CN | 107945760 A | 4/2018 |
| CN | 207882620 U | 9/2018 |
| CN | 109541850 A | 3/2019 |
| CN | 110262119 A | 9/2019 |
| CN | 110286525 A | 9/2019 |
| CN | 110646982 A | 1/2020 |
| TW | I364594 B | 5/2012 |
| TW | I658294 B | 5/2019 |

OTHER PUBLICATIONS

International Search Report corresponding to PCT/CN2020/110996; dated Dec. 2, 2020 (15 pages, including English translation).

* cited by examiner

300

| S31 | S32 |
|---|---|
| turning on the first light source to provide a brightness selected from the first set | turning on the second light source to provide a brightness selected from the second set |

Fig.9

LIQUID CRYSTAL DISPLAY PANEL, DRIVING METHOD THEREOF, AND DISPLAY DEVICE

RELATED APPLICATIONS

The present application is a 35 U.S.C. 371 national stage application of a PCT International Application No. PCT/CN2020/110996, filed on Aug. 25, 2020, which claims the benefits of priority of Chinese patent application No. 201910949636.3 filed on Oct. 8, 2019, the entire disclosure of which is incorporated herein by reference.

TECHNICAL FIELD

This disclosure generally relates to the field of display technologies. More specifically, this disclosure relates to a liquid crystal display panel, a display device comprising the same, and a method for driving the same.

BACKGROUND

Liquid crystal display panels are widely applied in various display devices due to a series of advantages such as light weight, thin thickness, high color gamut, good shock resistance, wide angle of view, high contrast and fast response speed. With the development and maturation of theoretical research and practical process about display technologies, the brightness level division of the liquid crystal display panel and corresponding color display performance has already satisfied normal demands. However, in some special display application scenarios such as medical display and electronic galleries, it is usually desirable that the liquid crystal display panels provide more brightness values so as to achieve a finer gray-scale display effect and color display effect.

SUMMARY

In an aspect of the disclosure, a liquid crystal display panel is provided. The liquid crystal display panel comprises: a first substrate; a second substrate opposite the first substrate; a liquid crystal layer between the first substrate and the second substrate; a first light source on a side of the first substrate; and a second light source on a side of the second substrate. The first substrate comprises: a first base substrate; a first functional layer between the first base substrate and the liquid crystal layer, the first functional layer comprising a first light extraction structure and a light filtration structure arranged alternately; a first polarization layer between the first functional layer and the liquid crystal layer, an orthogonal projection of the first polarization layer on the first base substrate overlapping an orthogonal projection of the light filtration structure on the first base substrate; and a first planar electrode layer between the first polarization layer and the liquid crystal layer. The second substrate comprises: a second base substrate; a second functional layer between the liquid crystal layer and the second base substrate, the second functional layer comprising a strip electrode zone, a first reflective zone and a first light absorption zone; an insulating layer between the strip electrode zone and the second base substrate; a second planar electrode layer between the insulating layer and the second base substrate; a second polarization layer between the second planar electrode layer and the second base substrate; and a second light extraction structure between the second polarization layer and the second base substrate, an orthogonal projection of the second light extraction structure on the first base substrate overlapping an orthogonal projection of the light filtration structure on the first base substrate. The first light source, the first light extraction structure, the first planar electrode layer, the liquid crystal layer, the strip electrode zone and the first reflective zone are configured to provide a brightness selected from a first set, the second light source, the second light extraction structure, the first polarization layer, the second planar electrode layer, the liquid crystal layer, the first planar electrode layer and the second polarization layer are configured to provide a brightness selected from a second set. Light emitted from the first light source and the second light source exits from a side of the first base substrate facing away from the second base substrate, and the first light source and the second light source are configured to not emit light simultaneously.

According to some embodiments of the disclosure, the first set and the second set do not intersect.

According to some embodiments of the disclosure, the first light extraction structure and/or the second light extraction structure comprise a light extraction grating.

According to some embodiments of the disclosure, an orthogonal projection of the first light extraction structure on the first base substrate does not overlap the orthogonal projection of the first polarization layer on the first base substrate.

According to some embodiments of the disclosure, the orthogonal projection of the second light extraction structure on the first base substrate overlaps orthogonal projections of the first polarization layer and the second polarization layer on the first base substrate; and the orthogonal projection of the second light extraction structure on the first base substrate does not overlap an orthogonal projection of the first light absorption zone on the first base substrate.

According to some embodiments of the disclosure, an orthogonal projection of the first reflective zone on the first base substrate is located between the orthogonal projection of the first light extraction structure on the first base substrate and an orthogonal projection of the first light absorption zone on the first base substrate; and a surface of the first reflective zone facing the first base substrate is provided at an acute angle with respect to the first base substrate.

According to some embodiments of the disclosure, the first light source comprises an edge-lit type light source, and the second light source comprises a direct type light source or an edge-lit type light source.

According to some embodiments of the disclosure, the light filtration structure comprises quantum dots, the quantum dots comprises at least one selected from a group consisting of red quantum dots, green quantum dots and colorless transparent scattering particles; and the first light source and the second light source comprise blue LEDs.

According to some embodiments of the disclosure, the liquid crystal display panel further comprises a first dielectric layer between the first base substrate and the light filtration structure, the first dielectric layer having a refractive index smaller than a refractive index of the first base substrate; and/or a second dielectric layer between the second base substrate and the second polarization layer, the second dielectric layer having a refractive index smaller than a refractive index of the second base substrate.

According to some embodiments of the disclosure, the first light extraction structure comprises a third dielectric layer having a refractive index greater than a refractive index of the first base substrate, and/or the second light filtration structure comprises a fourth dielectric layer having a refractive index greater than a refractive index of the second base substrate.

According to some embodiments of the disclosure, the liquid crystal layer has a thickness satisfying $\Delta n^* d = 2.5\lambda$, $\Delta n$ is a difference between a refractive index of a liquid crystal molecule in the liquid crystal layer along a long axis direction and a refractive index of the liquid crystal molecule along a short axis direction, d is the thickness of the liquid crystal layer and $\lambda$ is a wavelength of light emitted from the second light source.

According to some embodiments of the disclosure, an orthogonal projection of an end of the second light extraction structure close to the first reflective zone on the first base substrate overlaps an orthogonal projection of an end of the first reflective zone close to the second light extraction structure on the first base substrate, and the orthogonal projection of the first light extraction structure on the first base substrate does not overlap the orthogonal projection of the second light extraction structure on the first base substrate.

According to some embodiments of the disclosure, the liquid crystal display panel further comprises a third light source, the third light source is located on an other side of the first substrate opposite to the first light source; and the second functional layer further comprises a second reflective zone and a second light absorption zone, the second reflective zone and the first reflective zone are symmetrical about the strip electrode zone, the second light absorption zone and the first light absorption zone are symmetrical about the strip electrode zone.

In another aspect of this disclosure, a display device is provided, the display device comprising the liquid crystal display panel described in any of the above embodiments.

In yet another aspect of this disclosure, a method for driving the liquid crystal display panel is provided, comprising: turning on the first light source to provide a brightness selected from the first set by the first light source, the first light extraction structure, the first planar electrode layer, the liquid crystal layer, the strip electrode zone and the reflective zone; and turning on the second light source to provide a brightness selected from the second set by the second light source, the second light extraction structure, the first polarization layer, the second planar electrode layer, the liquid crystal layer, the first planar electrode layer and the second polarization layer.

It should be understood that the generic description above and the detailed description below are not intended to limit the protection scope of the present application in any possible way, but only exemplary and explanatory.

BRIEF DESCRIPTION OF DRAWINGS

The embodiments of this disclosure will be further described below with reference to the appended drawings in a non-restrictive manner, in which:

FIG. 9 schematically shows a flowchart of a method for driving the liquid crystal display panel according to an embodiment of this disclosure.

DETAILED DESCRIPTION OF EMBODIMENTS

As mentioned above, in some special display application scenarios, it is usually desirable that the liquid crystal display panels provide more brightness values so as to achieve a finer gray-scale display effect and color display effect. According to a conventional method for increasing the number of brightness values of a display panel, two display panels are stacked to achieve more brightness values. However, a display panel typically includes multiple film layers, which have different degrees of transmittance for light (e.g., light from a backlight source), so the method of stacking two display panels to achieve more brightness values will usually reduce the brightness of the display panel remarkably, thereby affecting the display effect of the display panel.

Embodiments of the disclosure provide a liquid crystal display panel which is capable of providing a finer division of brightness values without affecting light transmittance, thereby achieving a finer gray-scale display effect and color display effect.

To render objectives, technical solutions and advantages of the embodiments of the disclosure clearer, the technical solutions of the embodiments of this disclosure will be further described in detail with reference to the drawings. It should be pointed out that none of the exemplary drawings or depictions should be regarded as limiting this disclosure in any possible way. In fact, benefiting from the technical teaching in this disclosure, those skilled in the art can conceive of other suitable alternatives based on actual situations.

Figure 1:
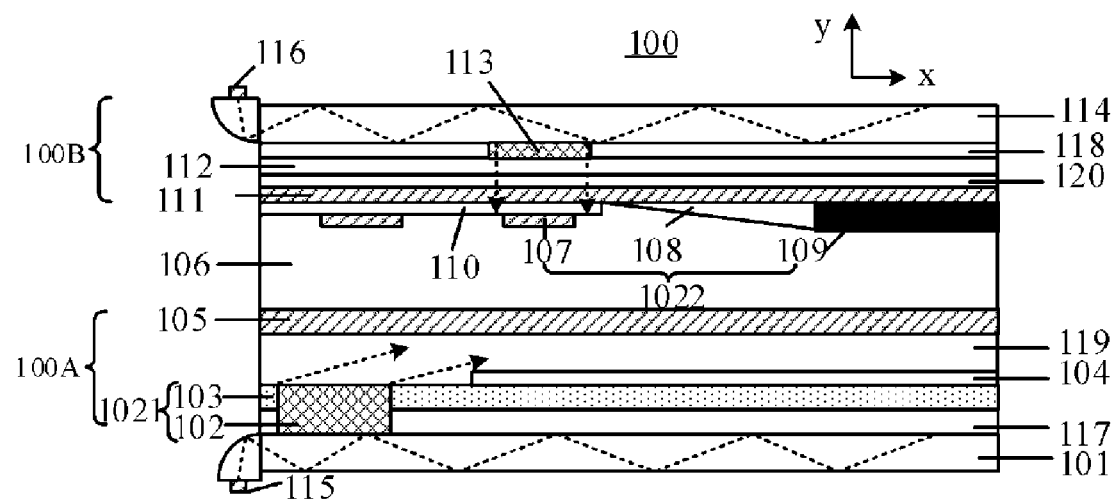
FIG. 1 schematically shows a section view of a liquid crystal display panel according to an embodiment of the disclosure.

FIG. 1 schematically shows a section view of a liquid crystal display panel according to an embodiment of the disclosure.

As shown in FIG. 1, the liquid crystal display panel 100 comprises a first substrate 100A, a second substrate 100B, a liquid crystal layer 106 between the first substrate 100A and the second substrate 100B, a first light source 115 located on a side of the first substrate 100A, and a second light source 116 on a side of the second substrate 100B. The first substrate 100A comprises a first base substrate 101, a first functional layer 1021 between the first base substrate 101 and the liquid crystal layer 106, the first functional layer 1021 comprising a first light extraction structure 102 and a light filtration structure 103 arranged alternately; a first polarization layer 104 between the first functional layer 1021 and the liquid crystal layer 106, an orthogonal projection of the first polarization layer 104 on the first base substrate 101 overlapping that of the light filtration structure 103 on the first base substrate 101; and a first planar electrode layer 105 located between the first polarization layer 104 and the liquid crystal layer 106. The second substrate 100B comprises a second base substrate 114; a second functional layer 1022 between the liquid crystal layer 106 and the second base substrate 114, the second functional layer 1022 comprising a strip electrode zone 107, a first reflective zone 108 and a first light absorption zone 109; an insulating layer 110 between the strip electrode zone 107 and the second base substrate 114; a second planar electrode layer 111 between the insulating layer 110 and the second base substrate 114; a second polarization layer 112 between the second planar electrode layer 111 and the second base substrate 114; and a second light extraction structure 113 located between the second polarization layer 112 and the second base substrate 114, an orthogonal projection of the second light extraction structure 113 on the first base substrate 101 overlapping that of the light filtration structure 103 on the first base substrate 101.

In an embodiment of this disclosure, the first light source 115, the first light extraction structure 102, the first planar electrode layer 105, the liquid crystal layer 106, the strip electrode zone 107 and the first reflective zone 108 are configured to provide a brightness selected from a first brightness set. The second light source 116, the second light extraction structure 113, the first polarization layer 104, the second planar electrode layer 111, the liquid crystal layer 106, the first planar electrode layer 105 and the second polarization layer 112 are configured to provide a brightness selected from a second brightness set. Light emitted from the first light source 115 and the second light source 116 exits from a side of the first base substrate 101 facing away from the second base substrate 114, and the first light source 115 and the second light source 116 do not emit light at the same time.

Herein the set of brightness of light provided by the first light source 115 and exiting from the side of the first base substrate 101 facing away from the second base substrate 114 is referred to as L1, and the set of brightness of light provided by the second light source 116 and exiting from the side of the first base substrate 101 facing away from the second base substrate 114 is referred to as L2. The set L1 and the set L2 are different, at least one element of the set L1 is different from any element of the set L2. In particular, in an exemplary embodiment, there is no intersection between the set L1 and the set L2. In some embodiments, a controller (not shown) of the liquid crystal display panel 100 can correspondingly control the first light source 115 or the second light source 116 to emit light depending on whether a desired brightness comes from the first set L1 or from the second set L2. For example, the controller of the liquid crystal display panel 100 controls the first light source 115 to emit light based on the fact that the desired brightness comes from the first set L1, and the controller of the liquid crystal display panel 100 controls the second first light source 116 to emit light based on the fact that the desired brightness comes from the second set L2. The implementation of the controller should be easily conceivable for those skilled in the art benefiting from the spirit and teaching of this disclosure, which will not be detailed herein.

How the liquid crystal display panel 100 provides more and finer brightness values will be described below with reference to the drawings.

In an exemplary embodiment, the first light source 115 acts as an edge-lit type light source and can be located on a side of the first base substrate 101 as shown in FIG. 1. In case the controller of the liquid crystal display panel 100 controls the first light source 115 to emit light based on the fact that the required brightness comes from the first set, the first light source 115 emits a collimated beam such that the beam enters the first base substrate 101 from a side surface of the first base substrate 101 at a suitable angle via a light deflection member (e.g., a light shade). After entering the first base substrate 101, the collimated beam can propagate for example by means of total reflections between upper and lower surfaces of the first base substrate 101, as indicated by dotted lines within the first base substrate 101 in FIG. 1. In this embodiment, apart from having a conventional support and protection function, the first base substrate 101 also serves as a light guide plate for the edge-lit type light source, which enables the first base substrate 101 to achieve multiple functions, thereby reducing the overall thickness of the liquid crystal display panel 100. In some embodiments, the first light source 115 and the second light source 116 are blue LEDs. Since the first light extraction structure 102 (e.g., a light extraction grating) and the second light extraction structure 113 (e.g., a light extraction grating) are usually selective to the wavelength of light emitted from the light source, a blue LED is more advantageous to the light extraction of the light extraction structure as compared with a white LED.

Figure 2:
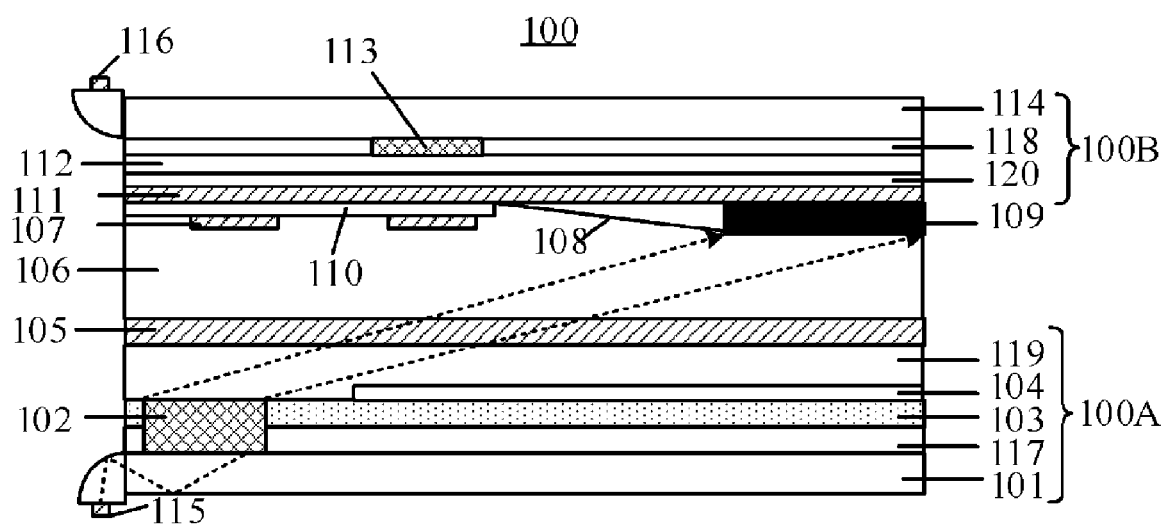
FIG. 2 schematically shows a schematic view of the liquid crystal display panel of FIG. 1 during an operation process.

The first light extraction structure 102 is disposed between the first base substrate 101 and the liquid crystal layer 106, and the first light extraction structure 102 at least partially discontinues the total reflection of light emitted from the first light source 115 within the first base substrate 101 and outcouples some of the light to the liquid crystal layer 106. In this embodiment, the first light extraction structure 102 comprises a light extraction grating. Apparently, the first light extraction structure 102 can also comprise other suitable structures. In an alternative embodiment, the first light extraction structure 102 comprises a third dielectric layer, the third dielectric layer having a refractive index greater than that of the first base substrate 101. The first light extraction structure 102 outcouples (e.g., partially) the light totally reflected at a surface of the first base substrate 101 contacting the first light extraction structure 102 by way of diffraction, as indicated by the arrows pointing diagonally upward on the first light extraction structure 102 in FIG. 1. As shown in FIG. 2, when no voltage is applied to the first planar electrode layer 105 and the strip electrode zone 107 (i.e., the liquid crystal layer 106 is not driven), the first light extraction structure 102 can be configured with a suitable light extraction angle α. The "light extraction angle α" refers to an angle α between light exiting from the first light extraction structure 102 and a normal of the first base substrate 101. In a specific example, the light extraction angle α of the first light extraction structure 102 can be 60° for example.

If no voltage is applied to the first planar electrode layer 105 and the strip electrode zone 107, light outcoupled from the first base substrate 101 via the first light extraction structure 102 propagates along the arrow direction of the dotted line in FIG. 2, impinges on the first light absorption zone 109 after passing through the liquid crystal layer 106 and is absorbed by the first light absorption zone 109. Specifically, an orthogonal projection of the first light extraction structure 102 on the first base substrate 101 does not overlap that of the first polarization layer 104 on the first base substrate 101, and light escaping from the first light extraction structure 102 enters the liquid crystal layer 106 without passing through the first polarization layer 104 (i.e., natural light). When the liquid crystal layer 106 is not driven, liquid crystal molecules in the liquid crystal layer 106 do not optically deflect the light incident therein, so light escaping from the first light extraction structure 102 can continue propagating in the liquid crystal layer 106 along the original propagation direction. The optical parameters (e.g., grating period) of the first light extraction structure 102 are matched with the size of the first light absorption zone 109, such that light escaping from the first light extraction structure 102 can all impinge on the first light absorption zone 109 after passing through the liquid crystal layer 106 and be adsorbed thereby, rather than impinge on the first reflective zone 108 adjacent to the first light absorption zone 109. Ideally, a width of the first light absorption zone 109 in a direction parallel with the surface of the liquid crystal display panel (i.e., direction x shown in FIG. 1) greater than or equal to that of the first light extraction structure 102 in direction x. In a specific example, the first light extraction structure 102 has a width of 17 μm in direction x. The first light absorption zone 109 can be any suitable structure capable of absorbing natural light. For example, the material of the first light absorption zone 109 comprises but is not limited to carbon black particles made of organic resin materials, metal materials (such as chromium) or metal oxide materials (such as chromium oxide). In this case, light emitted from the first light source 115 passes through the liquid crystal layer 106 and many other film structures and is finally absorbed by the first light absorption zone 109, so it cannot exit from the side of the first base substrate 101 facing away from the second base substrate 114.

Figure 3:
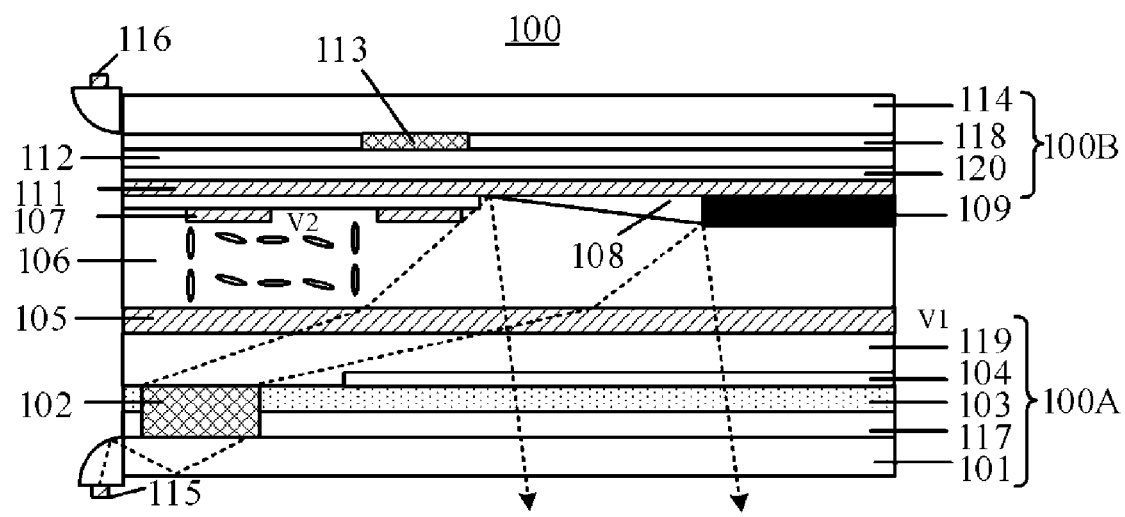
FIG. 3 schematically shows a schematic view of the liquid crystal display panel of FIG. 1 during another operation process.

As shown in FIG. 3, when a first voltage V1 and a second voltage V2 different from each other are applied to the first planar electrode layer 105 and the strip electrode zone 107 respectively (i.e., the liquid crystal layer 106 is driven), the liquid crystal molecules in the liquid crystal layer 106 can be equated with a liquid crystal prism, and after the light escaping from the first light extraction structure 102 enters the liquid crystal layer 106, the light propagation direction is deflected. If the values of the first voltage V1 and the second voltage V2 are selected such that the liquid crystal molecules in the liquid crystal layer 106 all rise up (i.e., the long axes of the liquid crystal molecules are in a direction perpendicular to the surface of the liquid crystal display panel, i.e., direction y in FIG. 1), the light extraction angle α of the first light extraction structure 102 can be 45° for example. In this embodiment, an orthogonal projection of the first reflective layer 108 on the first base substrate 101 is located between that of the first light extraction structure 102 on the first base substrate 101 and that of the first light absorption zone 109 on the first base substrate 101, so light deflected by the liquid crystal layer 106 no longer impinges on the first light absorption zone 109, but instead, is deflected upward onto the first reflective layer 108. The light is reflected on the surface of the first reflective layer 108, and the reflected light reenters the liquid crystal layer 106. After passing through the liquid crystal layer 106, the reflected light passes through structures such as the first polarization layer 104 and the light filtration structure 103 and exits from the side of the first base substrate 101 facing away from the second base substrate 114. A width of the first reflective layer 108 in direction x is smaller than that of the first light extraction structure 102 in direction x. For instance, in an example, the surface of the first reflective layer 108 facing the first base substrate 101 has a width of 10 μm in direction x.

The specific process of forming a liquid crystal prism in the liquid crystal layer 106 will be explained in detail with reference to FIG. 3 and FIG. 4.

Figure 4:
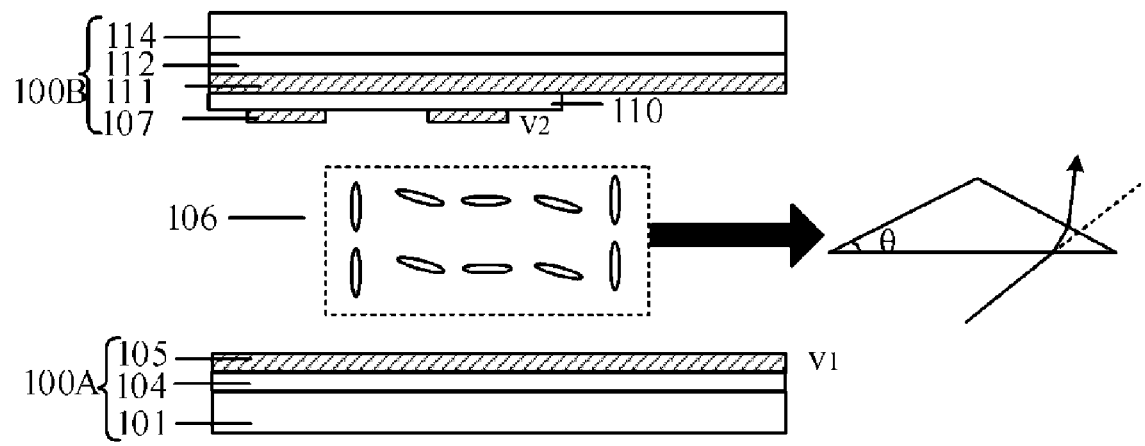
FIG. 4 schematically shows a schematic view of a liquid crystal prism formed in the liquid crystal layer of FIG. 3.

A fringe field switching (FFS) type electric field is formed between the first planar electrode layer 105 and the strip electrode zone 107 by applying a first voltage V1 to the first planar electrode layer 105 and a second voltage V2 to the strip electrode zone 107, which drives the liquid crystal molecules at different positions of the liquid crystal layer 106 to deflect at different degrees, thereby forming a plurality of liquid crystal prisms arranged in an array (one of the liquid crystal prism structures is indicated by a triangle in FIG. 4). In some embodiments, the first planar electrode layer 105 can be a common electrode layer configured to receive a common voltage Vcom (such as, 0V). In an alternative embodiment, in order to avoid undesired shielding effect of the second planar electrode layer 111 on the strip electrode zone 107, a third voltage V3 can be applied to the second planar electrode layer 111 while the first voltage V1 and the second voltage V2 are applied to the first planar electrode layer 105 and the strip electrode zone 107 respectively. The voltage value of the third voltage V3 can be equal to that of the first voltage V1 for the first planar electrode layer 105.

Specifically, the liquid crystal prism will vary with a voltage difference between the first voltage V1 and the second voltage V2. Generally, the liquid crystal prism can be expressed by two parameters, i.e., refractive index and base angle. In such an optically equivalent process, the refractive index of the equivalent liquid crystal prism can be fixed (e.g., extraordinary refractive index $n_e$ of liquid crystals), and a base angle θ (shown in FIG. 4) varying with the voltage difference can be used to express different equivalent liquid crystal prisms formed with different voltage differences. For example, the base angle θ of the liquid crystal prism can be changed by varying the value(s) of the first voltage V1 and/or the second voltage V2. That is, by varying the first voltage V1 applied to the first planar electrode layer 105 and/or the second voltage V2 applied to the strip electrode zone 107, the base angle θ of the liquid crystal prism formed in the liquid crystal layer 106 can be changed such that light entering the liquid crystal layer 106 from the first light extraction structure 102 will be deflected at different degrees to impinge on different positions of the first reflective zone 108 and be reflected thereby.

This means that, by appropriately choosing the voltage values of the first voltage V1 and the second voltage V2, the strongest light at the central angle position of the diffracted beam from the first light extraction structure 102 can impinge on the first reflective zone 108 and be reflected thereby after being deflected by the liquid crystal prism. The reflected light returns to the liquid crystal layer 106, passes through structures such as the first polarization layer 104 and the light filtration structure 103 and exits from the side of the first base substrate 101 facing away from the second base substrate 114. In this way, light with the strongest intensity can exit the liquid crystal display panel 100 from the side of the first base substrate 101 facing away from the second base substrate 114, thereby achieving display with the maximum brightness. Similarly, if the voltage values of the first voltage V1 and the second voltage V2 are chosen such that weaker light at an edge angle position of the diffracted beam from the first light extraction structure 102 can impinge on the first reflective zone 108 and be reflected thereby after being deflected by the liquid crystal prism, light finally exiting the liquid crystal display panel 100 from the side of the first base substrate 101 facing away from the second base substrate 114 will also have a weaker intensity, thereby achieving display with a smaller brightness. Therefore, display with different brightness values can be achieved by controlling the voltage values of the first voltage V1 applied to the first planar electrode layer 105 and the second voltage V2 applied to the strip electrode zone 107.

As shown in FIG. 3, a surface of the first reflective zone 108 facing the first base substrate 101 is set at an acute angle relative to the first base substrate 101. In a specific example, the acute angle can be 22°. In some embodiments, the first reflective zone 108 comprises an oblique prism structure. It is located between the second light extraction structure 113 and the first light absorption zone 109 and is adjacent to the first light absorption zone 109, and its width in a lateral extension direction of the first base substrate 101 is slightly greater than that of the first light extraction structure 102 in the lateral extension direction of the first base substrate 101. A width of the first reflective zone 108 can enable it to accept light deflected thereon even if the liquid crystal layer 106 is entirely driven to a maximum degree. Obviously, the shape of the first reflective zone 108 illustrated herein as an example only represents one possible implementation in the disclosure, but should not be construed as limiting this disclosure in any possible way. In fact, according to the spirit and teaching of this disclosure, those skilled in the art can choose other suitable shapes of the first reflective zone 108 based on specific situations, and this disclosure is intended to cover all these alternative implementations. The first reflective zone 108 can be made of a metal material or other materials with a high reflectivity.

In an exemplary embodiment, the light filtration structure 103 comprises a color filter layer. The color filter layer may comprise a red filter layer (R), a green filter layer (G) and a blue filter layer (B) for example, which enables the liquid crystal display panel 100 to achieve color display. Apparently, in light of the design requirements, the color filter layer can also adopt other color schemes such as RGBG, RGBW and so on. In some embodiments, the light filtration structure 103 comprises quantum dots, and the quantum dots comprise red quantum dots, green quantum dots and colorless transparent scattering particles. In this case, the first light source 115 and the second light source 116 both comprise blue LEDs. In this way, blue light emitted from the first light source 115 or the second light source 116 turns into red light after passing through a position corresponding to the red quantum dot, turns into green light after passing through a position corresponding to the green quantum dot, and remains blue light after passing through a position corresponding to the colorless transparent scattering particle, thereby achieving color display. The quantum dot color filter layer can achieve a fuller color display effect.

The operation process of the liquid crystal display panel 100 in the case that the first light 115 emits light has been described above. In short, when the liquid crystal layer 106 is not driven, light emitted from the first light source 115 is absorbed by the first light absorption zone 109, so it cannot exit from the side of the first base substrate 101 facing away from the second base substrate 114. When the liquid crystal layer 106 is driven, the voltage values of the first voltage V1 applied to the first planar electrode layer 105 and the second voltage V2 applied to the strip electrode zone 107 are controlled such that light with different intensities can exit from the side of the first base substrate 101 facing away from the second base substrate 114, which enables the liquid crystal display panel 100 to achieve a display effect with different brightness values.

The case in which the second light source 116 emits light will be described below with reference to FIG. 1, FIG. 5 and FIG. 6.

When a controller (not shown) of the liquid crystal display panel 100 controls the second light source 116 to emit light depending on the fact that the required brightness comes from the second set, the second light source can be an edge-lit type light source or a direct type light source. If it is a direct type light source, the second light source 116 can be arranged inside the second base substrate 114 and located on a side facing away from the first base substrate 101. The light emitted from the second light source 116 propagates within the second base substrate 114 by way of total reflection.

Exemplarily, in the example of FIG. 1, the second light source 116 is an edge-lit type light source and located on a side, e.g., the left side, of the first base substrate 114, as shown in FIG. 1. The second light source 116 emits a collimated beam such that the beam enters the second base substrate 114 from a side surface of the second base substrate 114 at a suitable angle via a light deflection member (e.g., a light shade). After entering the second base substrate 114, the collimated beam can propagate for example by means of total reflections between upper and lower surfaces of the second base substrate 114, as indicated by dotted lines within the second base substrate 114 in FIG. 1. In this embodiment, apart from having a conventional support and protection function, the second base substrate 114 can serve as a light guide plate for an edge-lit type light source or a direct type light source, i.e., the second base substrate achieves the purpose of multiple functions, thereby reducing the overall thickness of the liquid crystal display panel 100.

The second light extraction structure 113 is disposed between the liquid crystal layer 106 and the second base substrate 114, and the second light extraction structure 113 can at least partially discontinue the total reflection of light emitted from the second light source 116 within the second base substrate 114 and outcouple part of the light to the liquid crystal layer 106. In this embodiment, the second light extraction structure 113 comprises a light extraction grating. In a specific example, the second light extraction structure 113 has a width of 16 μm in direction x. Apparently, the second light extraction structure 113 can also have other suitable structures. In an alternative embodiment, the second light extraction structure 113 comprises a fourth dielectric layer, the fourth dielectric layer having a refractive index greater than that of the second base substrate 114. The second light extraction structure 113 outcouples (e.g., partially) the light totally reflected at a surface of the second base substrate 114 contacting the second light extraction structure 113 by way of diffraction, as indicated by the arrows on the second light extraction structure 113 in FIG. 1.

The second light extraction structure 113 is configured such that light incident thereon from the second base substrate 114 enters the liquid crystal layer 106 perpendicularly to the second base substrate 114. For example, parameters such as grating period of the second light extraction structure 113 can be chosen such that light emitted downward from the second light extraction structure 113 has a perpendicular exit angle with respect to the second base substrate 114. An orthogonal projection of the second light extraction structure 113 on the first base substrate 101 does not overlap that of the first light extraction structure 102 on the first base substrate 101, and that of the first reflective zone 108 and the first light absorption zone 109 on the first base substrate 101. In this case, light perpendicularly exiting from the second light extraction structure 113 will not impinge on the first light extraction structure 102 or the first reflective zone 108 or the first light absorption zone 109 below, which can avoid undesired second order diffraction at the first light extraction structure 102 or undesired reflection at the first reflective zone 108. Besides, an orthogonal projection of an end of the second light extraction structure 113 close to the first reflective zone 108 on the first base substrate 101 overlaps that of an end of the first reflective zone 108 close to the second light extraction structure 113 on the first base substrate 101. In an embodiment, an orthogonal projection of the second light extraction structure 113 on the first base substrate 101 overlaps both that of the first polarization layer 104 and that of the second polarization layer 112 on the first base substrate 101.

After passing through the second polarization layer 112, light exiting perpendicularly from the second light extraction structure 113 turns into linearly polarized light and enters the liquid crystal layer 106. The first polarization layer 104 and/or the second polarization layer 112 comprise(s) a metal wire grid polarizer, and the function of the metal wire grid polarizer is similar to that of a polarizer film, which plays a role of polarizing or analyzing. In this embodiment, a transmission axis direction of the first polarization layer 104 is perpendicular to that of the second polarization layer 112, and an angle between the transmission axis direction of the first polarization layer 104 and the initial orientation of liquid crystal molecules in the liquid crystal layer 106 and an angle between the transmission axis direction of the second polarization layer 112 and the initial orientation of liquid crystal molecules in the liquid crystal layer 106 are both 45°.

In some embodiments, the liquid crystal layer 106 has a thickness satisfying $\Delta n*d=2.5\lambda$, where $\Delta n$ is a difference between the refractive index of liquid crystal molecules in the liquid crystal layer 106 along a long axis direction and the refractive index along a short axis direction (e.g., $\Delta n=0.3$), d is a thickness of the liquid crystal layer 106 (e.g., about 5 μm) and $\lambda$ is a wavelength of light emitted from the second light source 116. By choosing a suitable wavelength $\lambda$ and a suitable difference $\Delta n$ between the refractive indexes of the liquid crystal molecules, the thickness d of the liquid crystal layer 106 can be compatible with the existing processing capacity while satisfying the thickness required for forming a liquid crystal prism.

Figure 5:
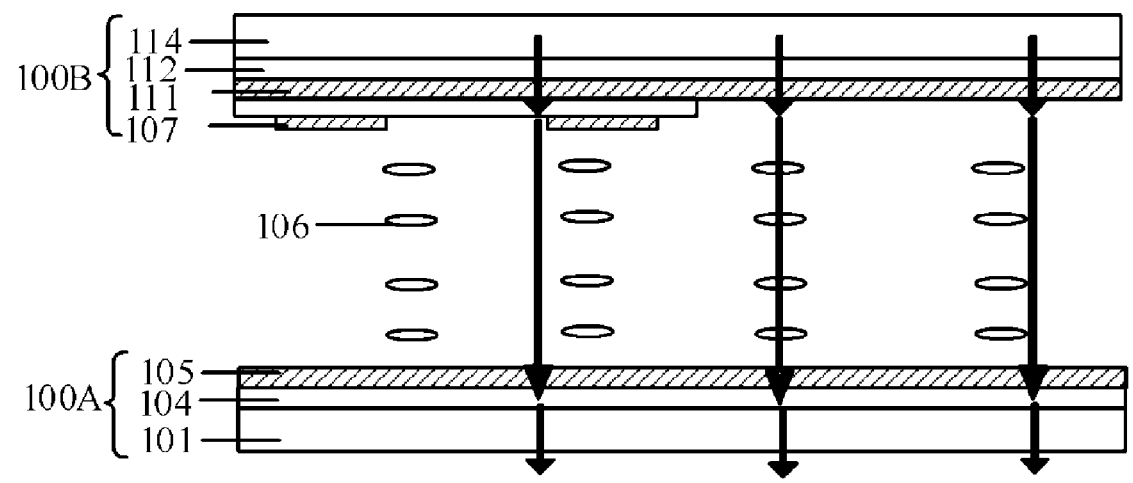
FIG. 5 schematically shows a schematic view of the liquid crystal display panel of FIG. 1 during yet another operation process.

As shown in FIG. 5, when no voltage is applied to the first planar electrode layer 105 or the second planar electrode layer 111 (i.e., the liquid crystal layer 106 is not driven), the liquid crystal molecules in the liquid crystal layer 106 are arranged horizontally along the long axis direction, and can be equated with a half-wave plate. As is known, when linearly polarized light passes through a half-wave plate, the outgoing light still remains linearly polarized light, but the vibration plane of the outgoing linearly polarized light is deflected by an angle of 2α relative to the vibration plane of the incident linearly polarized light, where α is an angle between the vibration plane of the incident linearly polarized light and the light axis of the crystal serving as the half-wave plate. With reference to the above description, the angle between the transmission axis direction of the first polarization layer 104 and the initial orientation of the liquid crystal molecules in the liquid crystal layer 106 is 45° (substantially equal to the angle between the vibration plane of the incident linearly polarized light and the light axis of the crystal, i.e., α), so after the linearly polarized light exiting from the second polarization layer 112 enters the liquid crystal layer 106, the polarization direction of the linearly polarized light is deflected by 90°. As mentioned above, the transmission axis direction of the first polarization layer 104 is perpendicular to that of the second polarization layer 112, so the polarization direction of the linearly polarized light exiting from the liquid crystal layer 106 is parallel with the transmission axis direction of the second polarization layer 112. Therefore, the linearly polarized light exiting from the liquid crystal layer 106 can pass through the first polarization layer 104, as indicated by the black arrows in FIG. 5. After passing through the light filtration structure 103 and the first base substrate 101, the linearly polarized light passing through the first polarization layer 104 exits from the side of the first base substrate 101 facing away from the second base substrate 114.

Figure 6:
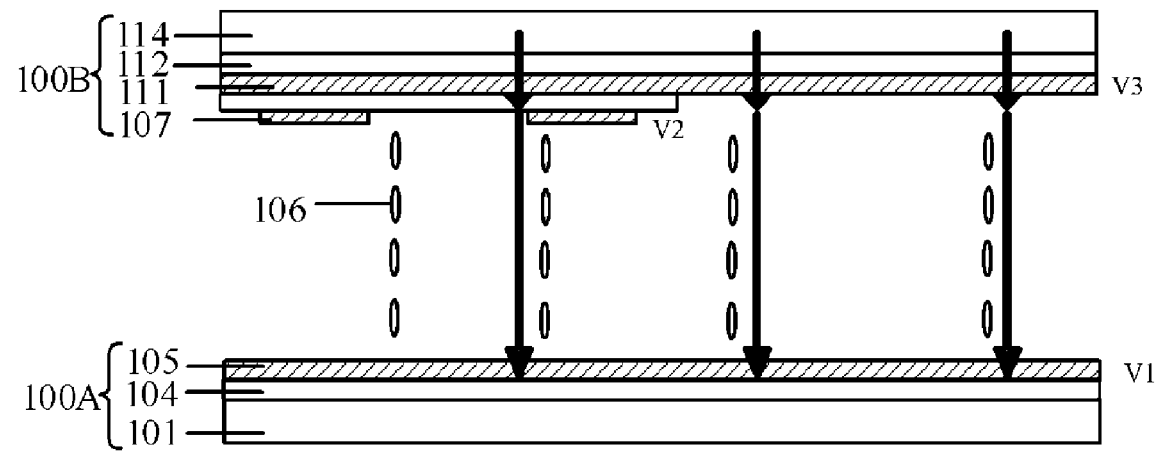
FIG. 6 schematically shows a schematic view of the liquid crystal display panel of FIG. 1 during still another operation process.

As shown in FIG. 6, when a first voltage V1 and a third voltage V3 are applied to the first planar electrode layer 105 and the second planar electrode layer 111 respectively (i.e., the liquid crystal layer 106 is driven), the liquid crystal molecules in the liquid crystal layer 106 all rise up and are arranged vertically along the long axis direction. In this case, the liquid crystal molecules in the liquid crystal layer 106 cannot change the polarization state of the polarized light incident therein. That is, the polarization direction of the polarized light passing through the liquid crystal layer 106 is still along the transmission axis direction of the second polarization layer 112. As mentioned above, the transmission axis direction of the first polarization layer 104 is perpendicular to that of the second polarization layer 112, so the polarization direction of the linearly polarized light exiting from the liquid crystal layer 106 is perpendicular to the transmission axis direction of the first polarization layer 104. Therefore, the linearly polarized light exiting from the liquid crystal layer 106 cannot pass through the first polarization layer 104, as indicated by the black arrows in FIG. 6. In this case, light emitted from the second light source 16 cannot finally exit from the side of the first base substrate 101 facing away from the second base substrate 114.

Therefore, the degree of deflection of the liquid crystal molecules in the liquid crystal layer 106 can be controlled through changing the voltage values of the first voltage V1 and/or the third voltage V3. For example, the voltage value of the third voltage V3 is greater than that of the first voltage V1, and the voltage value of the first voltage V1 can be 0 where appropriate. The voltage difference between the third voltage V3 and the first voltage V1 is controlled such that the liquid crystal molecules in the liquid crystal layer 106 are deflected to varying degrees, thereby controlling the intensity of light emitted from the second light source 116 and exiting from the first base substrate 101 and enabling the liquid crystal display panel 100 to achieve display with different brightness values. For example, the values of the first voltage V1 and the third voltage V3 can be chosen such that the difference between V3 and V1 is as small as possible (e.g., approaching 0), and now the liquid crystal molecules in the liquid crystal layer 106 are arranged horizontally along the long axis direction and can be equated with a half-wave plate. In this way, light with the strongest intensity can exit the liquid crystal display panel 100 from the side of the first base substrate 101 facing away from the second base substrate 114, thereby achieving display with the maximum brightness. Similarly, the values of the first voltage V1 and the third voltage V3 can be chosen such that the difference between V3 and V1 is as great as possible (e.g., approaching the voltage difference required for causing all liquid crystal molecules to rise up), so light with a weaker intensity can exit the liquid crystal display panel 100 from the side of the first base substrate 101 facing away from the second base substrate 114, thereby achieving display with a smaller brightness.

In an alternative embodiment, in order to avoid undesired shielding effect by the strip electrode zone 107 on the planar electrode layer 111, a second voltage V2 can be applied to the strip electrode zone 107 while the first voltage V1 and the third voltage V3 are applied to the first planar electrode layer 105 and the second planar electrode layer 111 respectively. The voltage value of the second voltage V2 can be equal to that of the third voltage V3 of the second planar electrode layer 111.

It should be noted that the first voltage V1, the second voltage V2 and the third voltage V3 represent the voltage signals applied to the first planar electrode layer 105, the strip electrode zone 107 and the second planar electrode layer 111 respectively, instead of the specific voltage values. The first voltage V1, the second voltage V2 and the third voltage V3 can have different voltage values according to actual needs. In an embodiment, the materials of the first planar electrode layer 105, the second planar electrode layer 111 and the strip electrode zone 107 comprise any suitable transparent conductive material, e.g., indium tin oxide (ITO), indium zinc oxide (IZO) and so on.

It should be pointed out that in case of the second light source 116 emitting light, when the liquid crystal layer 106 is driven, voltages are applied to the first planar electrode layer 105 and the second planar electrode layer 111 respectively. Due to the vertical electric field formed between the two planar electrode layers, the liquid crystal molecules at different positions of the liquid crystal layer 106 are deflected to a same degree, so no liquid crystal prism will be formed. In case of the first light source 115 emitting light, when the liquid crystal layer 106 is driven, voltages are applied to the first planar electrode layer 105 and the strip electrode zone 107 respectively. Due to the fringe field switching (FFS) type electric field formed between the planar electrode layer and the strip electrode zone, the liquid crystal molecules at different positions of the liquid crystal layer 106 are deflected to varying degrees, so a liquid crystal prism can be formed.

As can be seen from the above description, in the embodiments of the disclosure, the first light source 15 and the second light source 116 are provided on respective sides of the liquid crystal display panel 100 respectively. By controlling brightness sets L1 and L2 available from the first light source 115 and the second light source 116 such that the two light sources do not emit light at the same time, the display panel 100 can exhibit more brightnesses different from each other. That is, when the first light source 115 emits light, the first light source 115, the first light extraction structure 102, the first planar electrode layer 105, the liquid crystal layer 106, the strip electrode zone 107 and the first reflective zone 108 can provide a brightness from a first set. When the second light source 116 emits light, the second light source 116, the second light extraction structure 113, the first polarization layer 104, the second planar electrode layer 111, the liquid crystal layer 106, the first planar electrode layer 105 and the second polarization layer 112 can provide a brightness selected from a second set different from the first set. In other words, it can be simply considered: brightness of the liquid crystal display panel 100=brightness of the light source*efficiency of the liquid crystal. There are two light sources: the first light source 115 and the second light source 116, and in an example of 8-bit data, there are 256 cases for the efficiency of the liquid crystal. If there is no intersection between the first set and the second set, the liquid crystal display panel 100 can at most provide brightness of 2*256=512 different levels. As compared with a traditional liquid crystal display panel which only has light sources on one side (which can usually provide brightness of only 256 different levels in case of 8-bit data), the liquid crystal display panel 100 can provide more brightness values and thus achieve a finer brightness division.

Returning to FIG. 1, in an exemplary embodiment, the liquid crystal display panel 100 further comprises a first dielectric layer 117 between the first base substrate 101 and the light filtration structure 103, and a second dielectric layer 118 between the second base substrate 114 and the second polarization layer 112. The first dielectric layer 117 has a refractive index smaller than that of the first base substrate 101, and the second dielectric layer 118 has a refractive index smaller than that of the second base substrate 114. The existence of the first dielectric layer 117 and the second dielectric layer 118 makes it easier for light to be totally reflected within the first base substrate 101 and the second base substrate 114. This effectively prevents the risk of light leakage from the first base substrate 101 and the second base substrate 114 (obviously, the outcoupling by the first light extraction structure 102 and the second light extraction structure 113 is excluded), which can further improve the display effect of the liquid crystal display panel 100.

Continuously referring to FIG. 1, the liquid crystal display panel 100 further optionally comprises an insulating layer 110, a first planarization layer 119 and a second planarization layer 120. Specifically, the insulating layer 110 is arranged between the strip electrode zone 107 and the second planar electrode layer 111 so as to electrically isolate the strip electrode zone 107 from the second planar electrode layer 111. As an example, in an embodiment of this disclosure, the first planarization layer 119 has a refractive index smaller than that of the first base substrate 101; the insulating layer 110 and the second planarization layer 120 have a refractive index smaller than that of the second base substrate 114.

To sum up, the liquid crystal display panel provided in the embodiments of this disclosure can provide a finer brightness division without affecting the light transmittance, thereby achieving a finer gray-scale display effect and color display effect and overcoming the shortcoming of a reduced transmittance caused by the traditional scheme for increasing the level numbers of brightness.

Figure 7:
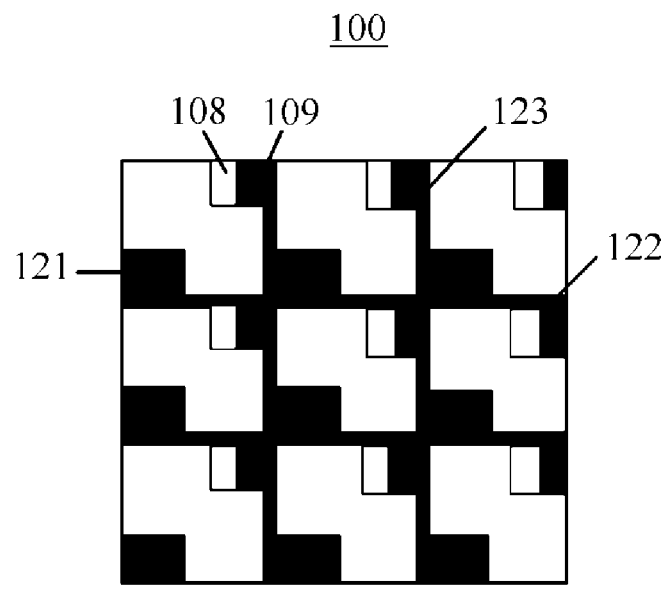
FIG. 7 schematically shows a plan view of the liquid crystal display panel according to an embodiment of this disclosure.

FIG. 7 is a schematic plan view of the liquid crystal display panel 100. As shown in FIG. 7, the liquid crystal display panel 100 comprises a plurality of gate lines 122 and data lines 123, the gate lines 122 and the data lines 123 intersect each other to define a plurality of pixel units. Each pixel unit shown in the figure comprises a thin film transistor 121, a first reflective zone 108 and a first light absorption zone 109. In fact, each pixel unit further comprises other structures such as a first light extraction 102, a light filtration structure 103, a strip electrode zone 107 and a second grating 113. A light shielding layer (indicated by black thick lines) is arranged above each gate line 122 and each data line 123, and a light shielding layer (indicated by black blocks) is also arranged above each thin film transistor 121. The light shielding layers can shield components such as the thin film transistor 121, the gate lines 122 and the data lines 123 on the array substrate and absorb visible light that cannot be normally controlled by the liquid crystal deflection and other stray light affecting the display effect, so as to enable the liquid crystal display panel 100 to have a better display effect.

It should be pointed out that for sake of clarity, FIG. 7 only shows part of the structures of the liquid crystal display panel 100. However, those skilled in the art should clearly know that the structures of the liquid crystal display panel 100 are not limited thereto, and it may further comprise other structures such as a pixel definition layer, a pixel circuit layer and so on, which cooperate with each other to achieve the required functions of the liquid crystal display panel 100.

Figure 8:
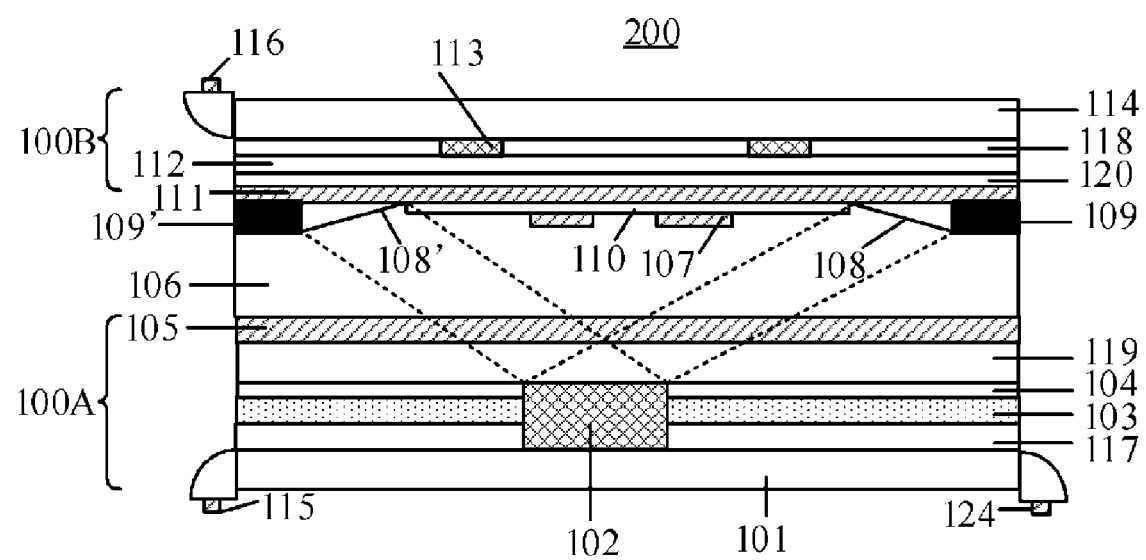
FIG. 8 schematically shows a section view of the liquid crystal display panel according to another embodiment of this disclosure.

FIG. 8 provides a variant of the liquid crystal display panel 100. The liquid crystal display panel 200 shown in FIG. 8 has generally the same structure as the liquid crystal display panel 100 shown in FIG. 1, so the same reference signs are used to indicate the same components. In contrast with the embodiment in FIG. 1, the liquid crystal display panel 200 further comprises a third light source 124, the third light source 124 being located on the other side of the first base substrate 101 opposite to the first light source 115. Besides, in the liquid crystal display panel 200, a second reflective zone 108' and a second light absorption zone 109' are provided additionally on other side of the strip electrode zone 107, the second reflective zone 108' and second light absorption zone 109' being arranged opposite the first reflective zone 108 and the first light absorption zone 109. In this case, the liquid crystal display panel 200 can provide more brightness values based on the liquid crystal display panel 100.

Specifically, a controller (not shown) of the liquid crystal display panel 200 can control the first light source 115 or the second light source 116 to emit light depending on the required brightness. For the corresponding operation process, the above description can be referred to, which will not be repeated herein. In addition, the controller of the liquid crystal display panel 200 may control the first light source 115 and the third light source 124 to emit light at the same time depending on the required brightness. When the first light source and the third light source 124 emit light at the same time, it can be similar to the operation process when the first light source 115 emits light as described above. Specifically, in case that the liquid crystal layer 106 is not driven, the optical parameters (e.g., grating period) of the first light extraction structure 102 are determined such that light outcoupled from the first base substrate 101 via the first light extraction structure 102 is all absorbed by the first light absorption zone 109 and the second light absorption zone 109', so light emitted from the first light source 115 and the third light source 124 cannot exit from the side of the first base substrate 101 facing away from the second base substrate 114. In case that the liquid crystal layer 106 is driven, the voltage values of the first voltage V1 applied to the first planar electrode layer 105 and the second voltage V2 applied to the strip electrode zone 107 are controlled such that the liquid crystal layer 106 can be equivalent to a liquid crystal prism. After entering the liquid crystal layer 106, light outcoupled from the first base substrate 101 via the first light extraction structure 102 is deflected, and impinges on the first reflective zone 108 and the second reflective zone 108' and is reflected thereby. The reflected light reenters the liquid crystal layer 106 and exits from the side of the first base substrate 101 facing away from the second base substrate 114. Therefore, by controlling the voltage values of the first voltage V1 applied to the first planar electrode layer 105 and the second voltage V2 applied to the strip electrode zone 107, the base angle θ of the liquid crystal prism can be controlled, and thus the intensity of light exiting the liquid crystal display panel 200 from the side of the first base substrate 101 facing away from the second base substrate 114 can be controlled, which enables the liquid crystal display panel 200 to achieve display with different brightnesses. It can be simply considered: brightness of the liquid crystal display panel 200=brightness of the light source*efficiency of the liquid crystal. In this embodiment, there are three light sources: the first light source 115, the second light source 116, and the third light source 124, and in the example of 8-bit data, there are 256 cases for the efficiency of the liquid crystal. If there is no intersection between the first set and the second set, the liquid crystal display panel 200 can at most provide brightness of 3*256=768 different levels. As compared with a conventional liquid crystal display panel which only has light sources on one side (which can usually provide brightness of only 256 different levels in the case of 8-bit data), the liquid crystal display panel 200 can provide more level numbers of brightness and thus achieve a finer brightness division.

According to another aspect of the disclosure, a display device is provided. The display device comprises the liquid crystal display panel described in any of the above embodiments. The display device can be any suitable device such as a television, a digital camera, a cellphone, a watch, a tablet computer, a notebook computer, a navigator or the like. The display device can solve substantially the same technical problem as the above liquid crystal display panel and achieve the same technical effect, so the technical effect of the display device will not be repeated herein.

According to yet another aspect of this disclosure, a method 300 for driving a liquid crystal display panel is provided, the liquid crystal display panel can be the liquid crystal display panel 100 described in any of the above embodiments. FIG. 9 is a flowchart of the driving method 300, and with reference to FIG. 9, the driving method 300 comprises steps as follows:

S31, turning on the first light source to provide a brightness selected from the first set by the first light source, the first light extraction structure, the first planar electrode layer, the liquid crystal layer, the strip electrode zone and the reflective zone;

S32, turning on the second light source to provide a brightness selected from the second set by the second light source, the second light extraction structure, the first polarization layer, the second planar electrode layer, the liquid crystal layer, the first planar electrode layer and the second polarization layer.

Specifically, if the controller of the liquid crystal display panel 100 controls the first light source 115 to emit light depending on the fact that the required brightness comes from the first set, step S31 is executed to drive the liquid crystal layer 106. Furthermore, a second voltage V2 is provided to the strip electrode zone 107 via data lines, and a first voltage V1 is provided to the first planar electrode layer 105 via data lines. By controlling the voltage values of the first voltage V1 applied to the first planar electrode layer 105 and the second voltage V2 applied to the strip electrode zone 107, the base angle θ of the liquid crystal prism can be controlled, and thus the intensity of light exiting the liquid crystal display panel 100 from the side of the first base substrate 101 facing away from the second base substrate 114 can be controlled, which enables the liquid crystal display panel 100 to display a brightness selected from the first set.

When the controller of the liquid crystal display panel 100 controls the second light source 116 to emit light depending on the fact that the required brightness comes from the second set, step S32 is executed to drive the liquid crystal layer 106. Furthermore, a third voltage V3 is provided to the second planar electrode layer 111 via data lines, and a first voltage V1 is provided to the first planar electrode layer 105 via data lines. By controlling the voltage values of the first voltage V1 applied to the first planar electrode layer 105 and the third voltage V3 applied to the second planar electrode layer 111, the deflection state of the liquid crystal molecules in the liquid crystal layer 106 can be controlled, and thus the intensity of light exiting the liquid crystal display panel 100 from the side of the first base substrate 101 facing away from the second base substrate 114 can be controlled, which enables the liquid crystal display panel 100 to provide a brightness selected from the second set.

With the method for driving a liquid crystal display panel provided in the embodiments of this disclosure, a finer brightness division can be achieved without affecting the light transmittance of the liquid crystal display panel, thereby achieving a finer gray-scale display effect and color display effect, and overcoming the shortcoming of a reduced transmittance caused by the traditional scheme for increasing the level numbers of brightness.

Those skilled in the art will understand that the term "substantially" herein does not exclude meanings of "entirely", "completely", "all" and so on. Therefore, in the embodiments, the term "substantially" can be removed. Where appropriate, the term "substantially" involves 90% or higher, such as 95% or higher, and particularly 99% or higher, or even more particularly 99.5% or higher, including 100%. The term "comprise" may be directed to embodiments in which the term "comprise" means "consist of". The term "and/or" in particular involves one or more of the items mentioned before and after "and/or". For example, the phrase "item 1 and/or item 2" and similar phrases can involve one or more of item 1 and item 2. The term "comprise" can mean "consist of" in an embodiment, but it can also mean "include at least the defined item and optionally one or more other items" in another embodiment.

Besides, the terms such as "first", "second" and "third" in the description and the claims are intended to distinguish similar elements rather than necessarily describe order or temporal sequence. It should be understood that the terms used as such are exchangeable in suitable cases, and the embodiments of this disclosure described herein can be implemented in sequences other than the one described or illustrated herein.

It should be pointed out that the embodiments mentioned above are used to illustrate the scope of the application rather than limit it, and those skilled in the art can design many alternative embodiments without deviating from the scope of the appended claims. In the claims, any reference sign placed within parentheses should not be construed as limiting the claims. The usage of the verb "comprise" and inflections thereof do not exclude the presence of elements or steps other than those recited in the claims. The article "a" or "an" preceding an element in the claims does not exclude the presence of a plurality of such elements. The mere fact that certain measures are recited in mutually different dependent claims does not indicate that a combination of these measures cannot be used to advantage.

Various aspects discussed in this patent can be combined to provide additional advantages. Furthermore, some of the features can form the basis of one or more divisional applications.

The invention claimed is:

1. A liquid crystal display panel, comprising:
a first substrate;
a second substrate opposite the first substrate;
a liquid crystal layer between the first substrate and the second substrate;
a first light source on a side of the first substrate; and
a second light source on a side of the second substrate,
wherein, the first substrate comprises:
a first base substrate;
a first functional layer between the first base substrate and the liquid crystal layer, the first functional layer comprising a first light extraction structure and a light filtration structure arranged alternately;
a first polarization layer between the first functional layer and the liquid crystal layer, an orthogonal projection of the first polarization layer on the first base substrate overlapping an orthogonal projection of the light filtration structure on the first base substrate; and
a first planar electrode layer between the first polarization layer and the liquid crystal layer;
wherein, the second substrate comprises:
a second base substrate;
a second functional layer between the liquid crystal layer and the second base substrate, the second functional layer comprising a strip electrode zone, a first reflective zone and a first light absorption zone;
an insulating layer between the strip electrode zone and the second base substrate;
a second planar electrode layer between the insulating layer and the second base substrate;
a second polarization layer between the second planar electrode layer and the second base substrate; and
a second light extraction structure between the second polarization layer and the second base substrate, an orthogonal projection of the second light extraction structure on the first base substrate overlapping an orthogonal projection of the light filtration structure on the first base substrate,
wherein the first light source, the first light extraction structure, the first planar electrode layer, the liquid crystal layer, the strip electrode zone and the first reflective zone are configured to provide a brightness selected from a first set, and the second light source, the second light extraction structure, the first polarization layer, the second planar electrode layer, the liquid crystal layer, the first planar electrode layer and the second polarization layer are configured to provide a brightness selected from a second set, and
wherein light emitted from the first light source and the second light source exits from a side of the first base substrate facing away from the second base substrate, and the first light source and the second light source are configured to not emit light simultaneously.

2. The liquid crystal display panel according to claim 1, wherein, the first set and the second set do not intersect.

3. The liquid crystal display panel according to claim 1, wherein, at least one of the first light extraction structure or the second light extraction structure comprise a light extraction grating.

4. The liquid crystal display panel according to claim 1, wherein an orthogonal projection of the first light extraction structure on the first base substrate does not overlap the orthogonal projection of the first polarization layer on the first base substrate.

5. The liquid crystal display panel according to claim 1, wherein the orthogonal projection of the second light extraction structure on the first base substrate overlaps orthogonal projections of the first polarization layer and the second polarization layer on the first base substrate; and
wherein the orthogonal projection of the second light extraction structure on the first base substrate does not overlap an orthogonal projection of the first light absorption zone on the first base substrate.

6. The liquid crystal display panel according to claim 1, wherein an orthogonal projection of the first reflective zone on the first base substrate is between the orthogonal projection of the first light extraction structure on the first base substrate and an orthogonal projection of the first light absorption zone on the first base substrate; and wherein a surface of the first reflective zone facing the first base substrate is provided at an acute angle with respect to the first base substrate.

7. The liquid crystal display panel according to claim 1, wherein the first light source comprises an edge-lit type light source, and the second light source comprises a direct type light source or an edge-lit type light source.

8. The liquid crystal display panel according to claim 1, wherein the light filtration structure comprises quantum dots, the quantum dots comprises at least one selected from a group consisting of red quantum dots, green quantum dots and colorless transparent scattering particles, and wherein the first light source and the second light source comprise blue LEDs.

9. The liquid crystal display panel according to claim 1, wherein the liquid crystal display panel further comprises at least one of a first dielectric layer and a second dielectric layer, wherein the first dielectric layer is between the first base substrate and the light filtration structure, the first dielectric layer has a refractive index smaller than a refractive index of the first base substrate, and wherein the second dielectric layer is between the second base substrate and the second polarization layer, the second dielectric layer has a refractive index smaller than a refractive index of the second base substrate.

10. The liquid crystal display panel according to claim 1, wherein, the first light extraction structure comprises a third dielectric layer having a refractive index greater than a refractive index of the first base substrate.

11. The liquid crystal display panel according to claim 1, wherein the liquid crystal layer has a thickness satisfying $\Delta n*d=2.5\lambda$, and wherein, $\Delta n$ is a difference between a refractive index of a liquid crystal molecule in the liquid crystal layer along a long axis direction and a refractive index of the liquid crystal molecule along a short axis direction, d is the thickness of the liquid crystal layer and $\lambda$, is a wavelength of light emitted from the second light source.

12. The liquid crystal display panel according to claim 1, wherein an orthogonal projection of an end of the second light extraction structure close to the first reflective zone on the first base substrate overlaps an orthogonal projection of an end of the first reflective zone close to the second light extraction structure on the first base substrate, and wherein the orthogonal projection of the first light extraction structure on the first base substrate does not overlap the orthogonal projection of the second light extraction structure on the first base substrate.

13. The liquid crystal display panel according to claim 1, further comprising:

a third light source, wherein the third light source is on another side of the first substrate opposite to the first light source, and wherein, the second functional layer further comprises a second reflective zone and a second light absorption zone, the second reflective zone and the first reflective zone are symmetrical about the strip electrode zone, the second light absorption zone and the first light absorption zone are symmetrical about the strip electrode zone.

14. A display device comprising the liquid crystal display panel according to claim 1.

15. The display device according to claim 14, wherein the light filtration structure comprises a fourth dielectric layer having a refractive index greater than a refractive index of the second base substrate.

16. The display device according to claim 14, wherein, the first set and the second set do not intersect.

17. The display device according to claim 14, wherein, at least one of the first light extraction structure and the second light extraction structure comprise a light extraction grating.

18. The display device according to claim 14, wherein an orthogonal projection of the first light extraction structure on the first base substrate does not overlap the orthogonal projection of the first polarization layer on the first base substrate.

19. The display device according to claim 14, wherein the orthogonal projection of the second light extraction structure on the first base substrate overlaps orthogonal projections of the first polarization layer and the second polarization layer on the first base substrate; and wherein the orthogonal projection of the second light extraction structure on the first base substrate does not overlap an orthogonal projection of the first light absorption zone on the first base substrate.

20. A method for driving the liquid crystal display panel according to claim 1, comprising:

turning on the first light source to provide a brightness selected from the first set by the first light source, the first light extraction structure, the first planar electrode layer, the liquid crystal layer, the strip electrode zone and the first reflective zone; and turning on the second light source to provide a brightness selected from the second set by the second light source, the second light extraction structure, the first polarization layer, the second planar electrode layer, the liquid crystal layer, the first planar electrode layer and the second polarization layer.

* * * * *